Sept. 25, 1962    H. KOCH ET AL    3,055,374
APPARATUS FOR SEVERING WRAPPER SHEETS
Filed Sept. 23, 1958    2 Sheets-Sheet 1

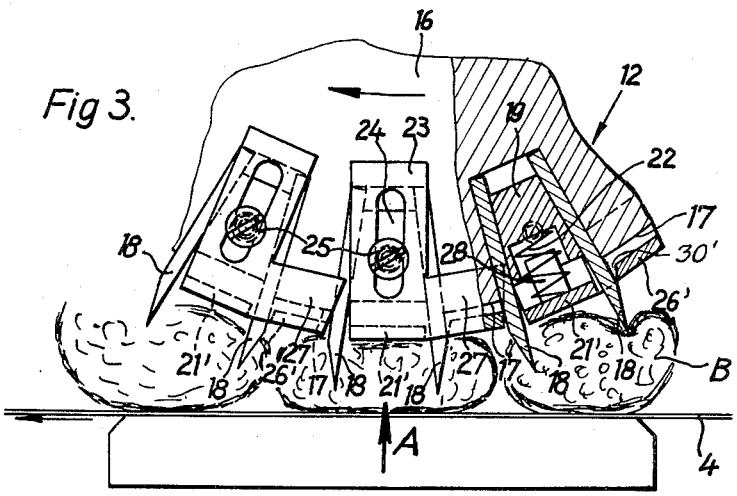
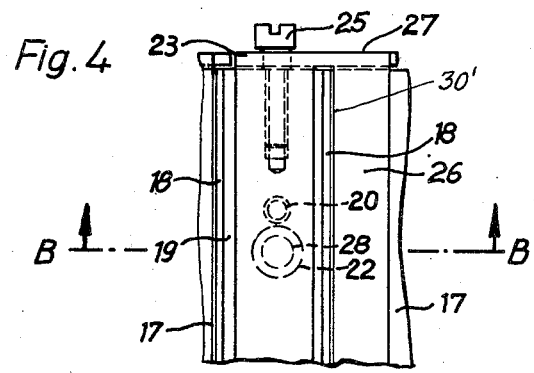
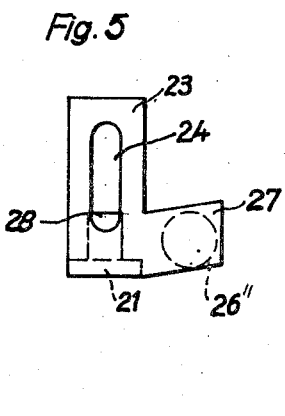

United States Patent Office 3,055,374
Patented Sept. 25, 1962

3,055,374
APPARATUS FOR SEVERING WRAPPER SHEETS
Hans Koch, Hamburg-Rahlstedt, and Otto Peters, Hamburg-Lohbrugge, Germany, assignors to Hauni-Werke Korber & Co., K.G.
Filed Sept. 23, 1958, Ser. No. 762,721
Claims priority, application Germany Sept. 26, 1957
6 Claims. (Cl. 131—149)

The present invention relates to apparatus for severing wrappers and particularly the wrappers of binders enclosing bundles or hands of tobacco.

As is known, tobacco bundles or hands are held together by a wrapper which must be cut or opened before further treatment of the leaf material, in the so-called slitting or trimming machines. This cutting or opening is generally effected shortly before or after the cutting of the leaf tips by means of a tearing or cutting device which is provided above an endless travelling belt feeding the leaf material and at a point adjacent the wrapper sheet to be severed.

The invention relates to slitting or trimming machines with a severing device above the conveyor belt, wherein the severing device is constructed as a cutter drum extending over the whole width of the belt and having cutter elements disposed transversely to the direction of conveyance and only the cutting edges thereof project from the periphery of the drum.

Such a cutter drum is therefore completely independent of the position of the wrapper sheet on the conveyor belt and displacement of the bundles by means of the cutter drum does not occur. In some cases the periphery of the cutter drum is of grooved formation between the cutter blades.

Axially arranged grooves are provided in the drum body to enable simple mounting of the cutter blades and the latter are held in position by means of wedges. The wedges lie approximately concentric to the peripheral surface of the drum when pressed into position. In one further constructional arrangement the cutter drum is driven independently and is provided with power transmission means and a driving motor to form a self-contained assembly which can be fastened as such to the machine frame. Thereby simple positioning laterally and vertically as well as a readily accessible installation of the device is possible.

For improving the reliability of the stripping or removal of the tobacco from the cutter blades, provision is made in a further construction of the invention that the peripheral surface of the drum is divided and the peripheral surface parts projecting beyond the edges of the cutter blades or at least disposed flush therewith are movable or yieldable, for example by a spring-urged construction, in such manner that they are moved away from and reveal the cutting edges on engagement against the bundles.

For this purpose the drum periphery consists of individual segments which are supported through the action of springs relatively to fin-like parts remaining between the grooves on the periphery of the drum and/or relatively to the wedges located between two cutter blades. The segments are secured to a holder which is displaceable in the radial direction relatively to the cutter drum. For simplicity in construction every second segment is fastened to adjacent segments subjected to the action of the springs and is guided by means of an associated part between the two adjacent blades.

The cutter drum is driven by means of a belt drive and is carried by a pivotal holder, the pivotal movement opposite to the feed direction being limited by means of stops. In general the weight of the holder and the cutter drum is sufficient to force these parts into the working position relatively to the leaf bundles and to enable the cutter blades projecting from the drum periphery to slit the bundles. Additional and in some cases springs may however also be arranged between the machine frame and the pivotal holder which press the holder against the stops.

One constructional example of the invention is shown diagrammatically in the accompanying drawing wherein:

FIG. 3 is an enlarged view of the lower part of the drum shown in FIG. 2,

FIG. 4 is a plan of the cutter blades of the drum seen in the direction of the arrow A in FIG. 3, and FIG. 5 is a detail view of a modification of the presser surfaces.

Figure 1:
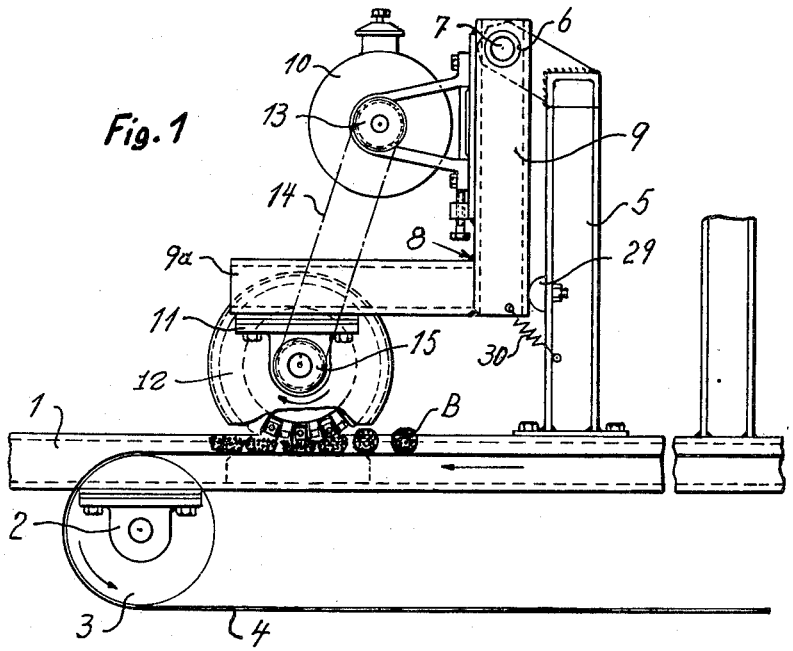
FIG. 1 is a side view of the device.

In the construction shown on the drawings bearings 2 are mounted on a machine frame 1 to carry the reverser rollers 3 for a conveyor belt 4 by which the already trimmed tobacco bundles are fed to the cutter drum 12 which in turn is pivotally mounted above the belt 4 on a support 5 fixed to the machine frame. For this purpose the upper part of the support 5 is forked and embodies a bearing 6 in which the pivot 7 of an angle-shaped holder 8 for the cutter drum 12 is pivotally mounted. One arm 9 of the holder 8 carries a driving motor 10 for the cutter drum and which is movable in the direction of length of the arm and the other arm 9a of the holder 8 carries bearing blocks 11 in which the cutter drum 12 is rotatably mounted. The cutter drum 12 is driven by the motor 10 by means of a belt pulley 13, belt 14 and driving pulley 15. Obviously a chain drive could be used instead of a belt drive. Stops 29 for example of rubber or other resilient material limit the pivotal movement of the cutter drum holder 8. If the weight of the cutter drum assembly is not sufficient to hold the cutter drum in the working position in which the knives are caused to project from the circumference of the drum a spring 30 can also be provided secured at one end on the cutter drum holder 8 and at the other end on the support 5.

Figure 2:
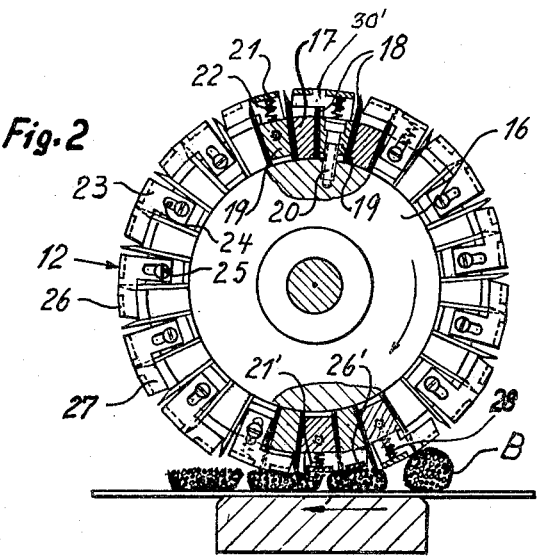
FIG. 2 is an enlarged end view of the drum partially in section.

In order that the cutter blades of the drum 12 shall be made operative for cutting, the drum comprises as shown in FIG. 2 a main body 16 the peripheral surface of which carries fins 17 secured thereto by welding or otherwise. The main body can obviously be formed in one piece together with the fins 17 and it will be seen that whatever construction is adopted, grooves are formed on the periphery of the drum body between the fins 17 in which in each case two cutter blades 18 are inserted which are held in place by wedges 19 and screws 20 passing through the wedges 19 and into the main body 16 (FIGURE 2). The peripheral surface of the cutter drum is formed in the region of the wedges 19 by segments 21 which are forced outwardly by compression springs 22 arranged between them and the wedges 19 and are fastened to the holders 23 provided with slots 24. The holders 23 are displaceably mounted at the two ends of the wedges 19 by means of screws 25, the movement being permitted as the result of the slots in the holders.

The outer surface of the cutter drum 12 is formed in the region of the fins 17 by segments 26 which are fastened to the holders 23 by means of connector lugs 27. The segments 21 and 26 are provided with a longitudinal slot 30' for the passage of one of the cutter blades 18 of an adjacent pair of blades. Radially directed projections 28 which are fastened to the segments 21 are guided between the two knives on each side thereof in a recess in the wedge 19 and enter into the outer ends of the helical compression springs 22. Thereby an undesirably great displacement of the segments 21 and 26 is avoided. In the modification shown in FIGURE 5 the segment 26" is replaced by a circular rod as shown in circular dash lines.

The device operates as follows: The conveyor belt 4 guides the tobacco bundles B to be unwrapped to the cutter drum 12 and during this movement the segments 21 and 26 coming into engagement with the bundles are pressed radially inwardly by the latter to the positions 21' and 26' (FIG. 3). The resulting uncovering or unsheathing of the cutter blades 18 permits them to engage the bundle and sever the wrapper sheet, whereby at the same time a flattening and initial loosening of the bundle is effected. On the further movement of the bundle the segments 21, 26 move radially outwardly to their original position and thus remove any leaf material possibly adhering to the blades 18.

What we claim is:

1. A device for severing the wrapper sheet of tobacco bundles, comprising a conveyor pathway along which said bundles are moved, a rotatable drum mounted above said pathway, a plurality of circumferentially spaced radially extending cutter elements mounted on said drum, presser members slidably guided on said drum between adjacent pairs of cutter elements, said presser members being provided with L-shaped supporting brackets at the ends thereof, one of the legs of each bracket being radially positioned relative to said drum, fastening elements slidably connecting the radial legs of said brackets to said drum, spring means for yieldingly urging said presser members outwardly beyond the edges of said cutter elements, said cutter elements and presser members being spaced a slight distance from said pathway to permit the tobacco bundles to be slightly compressed by the presser members while the wrappers are severed by the cutting edges of said cutting elements.

2. An apparatus for severing the wrapper sheets of tobacco bundles, comprising conveyor means for moving said bundles along a pathway, a rotary drum above the pathway, a plurality of circumferentially spaced cutters mounted on said drum, and a series of presser elements mounted on said rotary drum and located between adjacent cutter elements, guide brackets at the ends of said presser elements, a pin and slot connection between said brackets and drum, spring means for said presser elements, said presser elements being yieldingly urged in a radial direction to normally extend beyond the edges of the cutting elements and to yield under pressure to expose the cutting edges, said presser elements and said cutter elements being spaced from said pathway whereby the bundles of tobacco will be slightly compressed and will urge the presser elements inwardly to expose the cutter and permit the wrapper to be severed.

3. An apparatus for severing the wrapper sheets of tobacco bundles, comprising a conveyor for feeding the bundles along a pathway, a rotary drum mounted above said pathway, a series of circumferentially spaced cutter blades mounted in said drum to extend beyond the peripheral surface thereof, a series of presser members mounted on said drum between said cutter blades, guide means on said presser members, spring means for yieldingly urging said presser members radially outward so that the outer surfaces thereof extend beyond the edges of the cutter blades, each of said presser members being provided with a longitudinal slot to receive one of said cutter blades, said presser members and cutter blades being spaced a slight distance from said conveyor to permit the presser members to be urged inwardly when they engage said bundles and expose the cutting blades for severing the wrappers thereon, said guide means including L-shaped brackets located at the ends of said presser members and having radial legs with radial slots therein, fastener elements carried by the radial end walls of said drum passing through said slots.

4. A cutter drum according to claim 2 in which each presser element comprises two separate portions curved to form a part of the drum periphery and normally beyond the circumferential confines of the cutter blade edges, the arrangement being such that one cutter blade projects through a gap between adjacent presser elements while in each case an adjacent blade is provided between said two separate portions.

5. A device according to claim 3 wherein a frame is mounted above the conveyor pathway and arranged to swing vertically and supports the rotary drum, a motor mounted on said frame to rock with said frame and means for drivingly connecting said motor to said rotary drum, said drum being urged downwardly by gravity under the influence of its own weight and the weight of said motor.

6. A device according to claim 3, including wedge members for holding said cutter blades in longitudinal recesses in the periphery of said drum.

References Cited in the file of this patent

UNITED STATES PATENTS

| | | |
|---|---|---|
| 272,354 | Titus | Feb. 13, 1883 |
| 1,750,708 | Edwards | Mar. 18, 1930 |
| 2,003,404 | Valentine | June 4, 1935 |
| 2,113,843 | Kavle | Apr. 12, 1938 |
| 2,232,832 | Walborn | Feb. 25, 1941 |
| 2,518,960 | Tollison | Aug. 15, 1950 |
| 2,893,401 | Lauder | July 7, 1959 |

FOREIGN PATENTS

| | | |
|---|---|---|
| 593,588 | Germany | Mar. 5, 1934 |